US007161142B1

(12) United States Patent
Patterson et al.

(10) Patent No.: US 7,161,142 B1
(45) Date of Patent: Jan. 9, 2007

(54) PORTABLE MASS SPECTROMETERS

(75) Inventors: Garth E. Patterson, Brookston, IN (US); Brent A. Knecht, Lebanon, IN (US)

(73) Assignee: Griffin Analytical Technologies, West Lafayette, IN (US)

( * ) Notice: Subject to any disclaimer, the term of this patent is extended or adjusted under 35 U.S.C. 154(b) by 0 days.

(21) Appl. No.: 11/218,635

(22) Filed: Sep. 6, 2005

Related U.S. Application Data

(60) Provisional application No. 60/607,940, filed on Sep. 7, 2004, provisional application No. 60/607,109, filed on Sep. 3, 2004, provisional application No. 60/500,398, filed on Sep. 5, 2003.

(51) Int. Cl.
*H01J 49/00* (2006.01)
*B01D 59/44* (2006.01)

(52) U.S. Cl. ...................... 250/281; 250/282; 250/283; 250/292; 250/300

(58) Field of Classification Search ..................... None
See application file for complete search history.

(56) References Cited

U.S. PATENT DOCUMENTS 3,495,186 A 2/1970 Wright
3,621,464 A 11/1971 Bryndza et al.
3,641,340 A 2/1972 Van Der Grinten et al.
5,579,202 A 11/1996 Tolfsen et al.
5,734,163 A 3/1998 Hayashi et al.
6,205,043 B1 3/2001 Chutjian et al.
6,434,031 B1 8/2002 Chutjian et al.
6,583,702 B1 6/2003 Chutjian et al.
6,982,413 B1 * 1/2006 Knecht et al. .............. 250/281

OTHER PUBLICATIONS

Stafford, G.C. et al., "Recent Improvements in and Analytical Applications of Advanced Ion Trap Technology," *Int'l J. Mass. Spectrom. Ion Processes*, 60, 85-98 (1984).
Franzen, J., "The Non-Linear Ion Trap. Part 4. Mass Selective Instability Scan With Multipole Superposition," *Int'l J. Mass. Spectrom. Ion Processes*, 125, 165-70 (1993).
Wells, J.M. et al., "A Quadrupole Ion Trap with Cylindrical Geometry Operated in the Mass-Selective Instability Mode," *Anal. Chem.*, 70, 438-444 (1998).
Louris, J. et al., "The Paul Ion Trap Mass Selective Instability Scan: Trap Geometry and Resolution," *Proceedings of the 40th ASMS Conference on Mass Spectrometry and Allied Topics*, Washington, D.C. (1992).
Patterson, G.E. et al., "An Alternate Ion Instability Scan Mode for a Quadrupole Ion Trap," *Proceedings of the 47th ASMS Conference on Mass Spectrometry and Allied Topics*, Dallas, TX (1999).

* cited by examiner

*Primary Examiner*—Nikita Wells
(74) *Attorney, Agent, or Firm*—Finnegan, Henderson, Farabow, Garrett & Dunner LLP

(57) ABSTRACT

The present invention relates to a mass spectrometer, and more specifically a portable mass spectrometer. In one implementation, the mass spectrometer includes a toroidal transformer. In another implementation, the mass spectrometer includes feedback circuitry to monitor signals applied in the mass spectrometer.

43 Claims, 10 Drawing Sheets

PORTABLE MASS SPECTROMETERS

CROSS-REFERENCE TO RELATED APPLICATION

This application claims the benefit of U.S. Provisional Application No. 60/607,940, filed Sep. 7, 2004, by Garth E. Patterson and titled MASS SPECTROMETRY ANALYSIS TECHNIQUES AND MASS SPECTROMETRY CIRCUITRY, the disclosure of which is expressly incorporated herein by reference and U.S. Provisional Application No. 60/607,109, filed Sep. 3, 2004, by Brent A. Knecht and Garth E. Patterson and titled PORTABLE MASS SPECTROMETER HAVING RADIO FREQUENCY AMPLIFIER CIRCUITRY OF REDUCED SIZE, which is a substitute application of U.S. Provisional Application No. 60/500,398 filed Sep. 5, 2003, which was expressly abandoned as of Sep. 3, 2004, the disclosures of which are both expressly incorporated herein by reference.

FIELD OF THE INVENTION

The present invention relates to mass spectrometers and their associated circuitry and, more specifically, to portable mass spectrometers.

BACKGROUND OF THE INVENTION

Mass spectrometry is a widely used qualitative and quantitative method for analyzing various sample types. Because mass spectrometry instrumentation is typically large, bulky, and very sensitive to changes in climate and power supply, mass spectrometry analyses are typically performed in the laboratory rather than the field. Recently, these instruments are being reduced in size for the purposes of bringing the instruments to the field. This allows analytical scientists to perform analysis actually at the sample site, which can alleviate sample transport and preparation, and thereby reduce errors in analysis.

Certain types of mass spectrometers include ion traps for detection and subsequent measurement of ions having various mass-to-charge ratios. FIG. 1 depicts a hyperbolic Paul ion trap 100, which was invented by Wolfgang Paul in 1953. Hyperbolic Paul ion trap 100 comprises a toroidal ring electrode 105 having a hyperbolic cross section, situated between two end-cap electrodes 110, 115, which are also of hyperbolic cross section. In FIG. 1, $z_0$ indicates the center-to-end cap spacing, and $r_0$ indicates the ring electrode radius.

FIG. 2 depicts a cylindrical ion trap (CIT) 200, which is a derivative of the hyperbolic Paul ion trap. CIT 200 comprises an annular or barrel-shaped cylindrical ring electrode 210 situated between two flat end-cap electrodes 212*a*, 212*b*. In FIG. 2, $z_b$ indicates the ring electrode half-height, and thus the spacing between ring and end caps is given by $(z_0 - z_b)$. The concept of simplifying the hyperbolic ion trap geometry by approximating the hyperbolic electrode surfaces with flat electrodes was described by Langmuir et al. in 1962.

Ions can be trapped within a CIT volume by the appropriate application of radio-frequency (RF) and direct current (DC) voltages to the electrodes. For example, one method for trapping ions is to apply the RF voltage to the ring electrode and to ground the end-cap electrodes. Ions created inside the boundaries of the electrodes or introduced into the boundaries of the electrodes from an external ion source can be trapped in the oscillating potential well created by the applied RF voltage. A detailed description of ion motion in hyperbolic ion traps and CITs is beyond the scope of this document, and can be found in a number of publications. In addition to ion storage, the CIT can be used as a mass analyzer in a number of modes of operations.

The amplitude of the RF voltage waveform used to trap ions is related to the mass of the ions that are trapped in the device. Therefore, in order to alter the stability of the ions in the trap, the amplitude of the RF waveform can be altered. The primary method of mass analysis in an ion trap is referred to as “mass selective instability” and utilizes a ramp in the amplitude of the applied RF waveform to cause instability in the ion trap in a mass selective way. The amplitude of the RF waveform after it has ramped up can be quite high, such as in the thousands of volts.

In order to achieve an RF voltage level in the thousands of volts, a mass spectrometer typically includes a step up transformer that is used to amplify the RF signal to be applied to the ring electrode of the ion trap. Such step up transformers are known to include primary and secondary coils wound in a cylindrical shape and functioning as inductors. The cylindrical shape of the coil windings provides the transformer with a suitably high peak output voltage. In order to maintain the cylindrical shape of the coil windings, the windings can be wound around a non-conductive, non-magnetic cylindrical core. Alternatively, the coil can be wound in the air in the shape of a cylindrical coil spring without any supporting central core. Amplification of the RF signal can also be achieved with a single coil. In this case, amplification results from the resonance nature of the capacitive load of the ion trap and the inductance of the coil.

One drawback of cylindrically wound coils is that although they provide a suitably high peak output voltage with which to amplify the RF signals, they occupy a large amount of space within the mass spectrometer. For example, a cylindrical transformer is typically at least three inches in diameter and six inches in height. Therefore, coils of this type make it difficult to reduce the size of a mass spectrometer sufficient to allow the device to be truly portable.

Another drawback is that in order to precisely tune the RF signals, the voltage typically must be tuned by inductance. Tuning inductors are typically of large size. Therefore, this further increases the size of the mass spectrometer, reducing its portability.

In addition, because of the importance of the application of an accurate voltage and waveform to the CIT, the instruments must be carefully calibrated. For example, instruments are typically calibrated by analyzing a known compound by known fragmentation patterns under known voltage ramping parameters. After fragmentation, the voltage of the mass analyzer is ramped at a certain rate over time. As this voltage increases mass fragments having known mass to charge ratios are detected at certain times. By correlating the timing of the fragments detected with the timing of the voltage ramp the mass analyzer can be calibrated. While this calibration technique has been the standard for many years in the laboratory where the environment and power supplies are generally constant, for portable instruments reliance on this technique leads to erroneous determinations and necessitates multiple calibrations over time.

FIG. 3 illustrates an exemplary standard voltage ramp of the type typically provided to a CIT during mass analysis in prior art devices. FIG. 4 illustrates the mass spectra (relative abundance of ions versus the mass to charge ratio of the ions) of methyl salicylate under the ramping conditions of FIG. 3. FIG. 5 represents desired mass spectra of methyl salicylate. As shown in FIG. 3, the voltage tends to lose its linear function and level off over time. This level off is not desirable because it results in an inconsistent peak shapes in the resulting mass spectra. Ideally, the ramp would be perfectly linear and reproducible, which would result in constant peak shapes. For example, when the peak widths of the spectra of FIG. 4 are compared with the peak widths of the spectra of FIG. 5, it is apparent that the widths of FIG. 4 are less than desirable due to at least the peak broadening at higher mass to charge ("m/z") ratios. This inconsistent peak width is a symptom of mis-calibration, which leads to erroneous analytical results.

Therefore, there is a need for a transformer of a mass spectrometer that can produce RF signals of suitably high voltage levels within a minimum of occupied space. There is also a need for improved calibration techniques for mass spectrometers.

SUMMARY OF THE INVENTION

Apparatus consistent with the invention provide for a mass spectrometer, which produces RF signals of suitably high voltage levels within a minimum of occupied space. Apparatus consistent with the invention also provide for a mass spectrometer with improved calibration techniques.

In accordance with one aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal, and an ion trap including an electrode, wherein the amplified radio frequency voltage signal is applied to the electrode to analyze the sample. In this embodiment, the amplifying circuit includes a toroidally shaped transformer.

In accordance with another aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal; a mass analyzer, wherein the amplified radio frequency voltage signal is applied to the mass analyzer to analyze the sample; a feedback circuit for generating a feedback radio frequency voltage signal based on the amplified radio frequency voltage signal applied to the mass analyzer; and a signal processor to instruct the signal generator to alter the radio frequency voltage signal based on the feedback radio frequency voltage signal.

In accordance with another aspect of the invention, apparatus consistent with the invention provide for a mass spectrometer for analyzing a sample. The mass spectrometer includes a signal generator to generate a radio frequency voltage signal, wherein the signal generator includes a tuning capacitor to tune the radio frequency voltage signal; an amplifying circuit to amplify the radio frequency voltage signal, the amplifying circuit including a toroidally shaped transformer; and an ion trap including an electrode; wherein the amplified radio frequency voltage signal is applied to the electrode to analyze the sample.

In accordance with another aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal, the amplifying circuit including a toroidally shaped transformer; an ion trap including an electrode; wherein the amplified radio frequency voltage signal is applied to the electrode to analyze the sample; and a feedthrough comprising a wire embedded in epoxy to apply the amplified radio frequency voltage signal to the electrode.

In accordance with another aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal, the amplifying circuit including a toroidally shaped transformer; a cylindrical ion trap including an electrode; wherein the amplified radio frequency voltage signal is applied to the electrode to analyze the sample; a feedback circuit for generating a feedback radio frequency voltage signal based on the amplified radio frequency voltage signal applied to the electrode; and a signal processor to instruct the signal generator to alter the radio frequency voltage signal based on the feedback radio frequency voltage signal.

In accordance with another aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal, the amplifying circuit including a toroidally shaped transformer; an ion trap including an electrode; wherein the amplified radio frequency voltage signal is applied to the electrode to analyze the sample; and a housing encasing the signal generator, amplifying circuit, and ion trap having dimensions of no greater than about 6 inches×7 inches×8 inches.

In accordance with another aspect of the invention, methods consistent with the invention provide for a method of analyzing a sample with a mass spectrometer. The method includes generating a radio frequency voltage signal; amplifying the radio frequency voltage signal using a toroidally shaped transformer; and applying the amplified radio frequency voltage to an electrode of an ion trap to analyze the sample.

In accordance with another aspect of the invention, methods consistent with the invention provide for a method of analyzing a sample with a mass spectrometer. The method includes generating a radio frequency voltage signal; amplifying the radio frequency voltage signal; applying the amplified radio frequency voltage signal to a mass analyzer to analyze the sample; generating a feedback radio frequency voltage signal based on the amplified radio frequency voltage signal applied to the mass analyzer; and altering the radio frequency voltage signal based on the feedback radio frequency voltage signal.

In accordance with another aspect of the invention, methods consistent with the invention provide for a method of analyzing a sample with a mass spectrometer. The method includes generating a radio frequency voltage signal; amplifying the radio frequency voltage signal using a toroidally shaped transformer; applying the amplified radio frequency voltage signal to an electrode of a cylindrical ion trap to analyze the sample; generating a feedback radio frequency voltage signal based on the amplified radio frequency voltage signal applied to the electrode; and altering the radio frequency voltage signal based on the feedback radio frequency voltage signal.

In accordance with another aspect of the invention, apparatus consistent with the invention provide for a mass spectrometer for analyzing a sample. The mass spectrometer includes a signal generator to generate a radio frequency voltage signal; an amplifying circuit to amplify the radio frequency voltage signal; a mass analyzer, wherein the amplified radio frequency voltage signal is applied to the mass analyzer to analyze the sample; a feedback circuit for generating a feedback radio frequency voltage signal based on the amplified radio frequency voltage signal applied to the mass analyzer; and wherein the mass analyzer determines the mass of molecules contained in the sample based on a measurement of the feedback radio frequency voltage signal.

In accordance with another aspect of the invention, methods consistent with the invention provide for a method of analyzing a sample with a mass spectrometer. The method includes generating a radio frequency voltage signal; amplifying the radio frequency voltage signal; applying the amplified radio frequency voltage signal to a mass analyzer to analyze the sample; generating a feedback radio frequency voltage signal based on the amplified radio frequency voltage signal applied to the mass analyzer; measuring the feedback radio frequency voltage signal; and determining the mass of molecules contained in the sample based on the measurement of the feedback radio frequency voltage signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Apparatus consistent with the present invention are described herein with respect to mass spectrometers, and, in particular, portable mass spectrometers. FIGS. 6–11 illustrate exemplary embodiments consistent with the invention.

Figure 6:
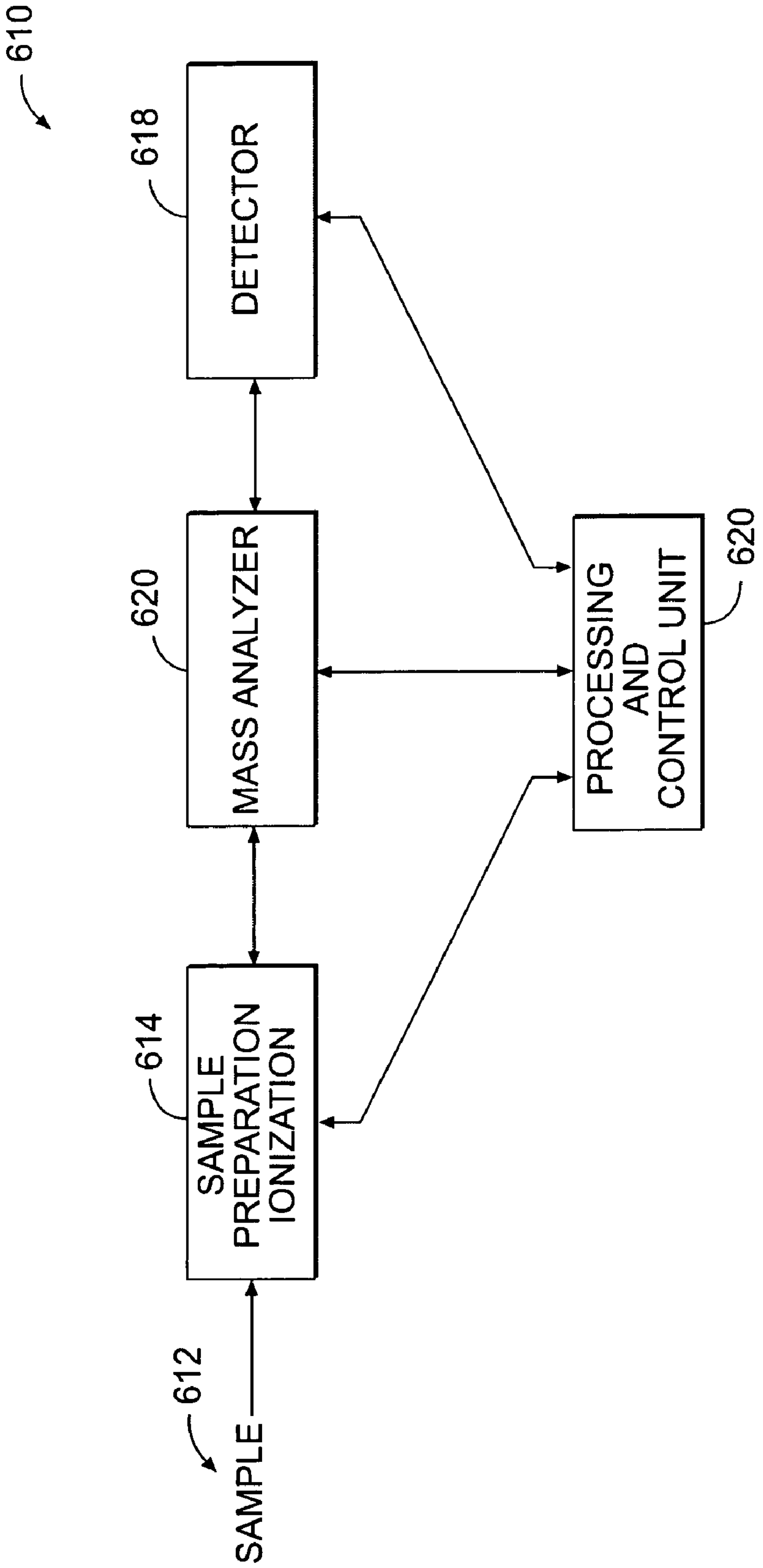
FIG. 6 is a block diagram depicting a mass spectrometer consistent with one embodiment of the invention.

FIG. 6 is a block diagram depicting a mass spectrometer consistent with one embodiment of the invention. As shown in FIG. 6, a mass spectrometer 610 includes a sample preparation ionization region 614 configured to receive a sample 612, a mass analyzer 616 and a detector 618. Sample preparation ionization region 614, mass analyzer 616, and detector 618 can all be controlled by processing and control unit 620. This implementation is merely exemplary, and other implementations may also be used.

Sample 612 can represent any chemical composition including both inorganic and organic substances in solid, liquid, and/or vapor form. Specific examples of sample 612 suitable for analysis include volatile compounds such as toluene, semi-volatile compounds such as methyl salicylate, and/or more highly complex non-volatile protein-based structures such as bradykinin. In certain aspects, sample 612 can be a mixture containing a number of substances or in other aspects sample 612 can be a substantially pure substance.

In one implementation, sample 612 enters mass spectrometer 610 though sample preparation and ionization region 614. Sample preparation and ionization region 614 may be configured to prepare sample 612 for analysis. Types of sample preparation and ionization regions may include batch inlets, direct probe inlets, chromatographic inlets, and/or permeable or capillary membrane inlets. Sample preparation and ionization region 614 may also be configured to prepare sample 612 for analysis in the gas, liquid and/or solid phase. Sample preparation and ionization region 614 can also include an ion source configured to receive sample 612 and convert components of sample 612 into ions. This conversion can include the bombardment of components of sample 612 with electrons, ions, molecules, and/or photons. Ionization may also be performed by thermal or electrical energy. Ionization may also be performed by generating electrons in the ionization region and transporting those electrons into the ion trap where they can collide with the sample generating ions.

Mass analyzer 616 receives ions from sample preparation and ionization region 614. Exemplary mass analyzers 616 can include quadrupole ion traps, electrical ion traps, and quadrupole ion trap/time-of-flight mass spectrometers as well as linear and rectilinear ion traps. As described above, an exemplary mass analyzer 616 useful in accordance with one implementation is a cylindrical ion trap (CIT). Detector 618 can be configured to receive ions from mass analyzer 616. Exemplary detectors include electron multipliers, Faraday cup collectors, photographic and simulation-type detectors. These implementations are merely exemplary, and other implementations may also be used.

Calibration of instrument 610 and the control of the progression of sample 612 from sample preparation ionization region 614 through to detector 618 can be controlled and monitored by processing and control unit 620. Processing and control unit 620 may comprise processing circuitry such as a processor configured to execute programming, hardware circuitry (e.g., DSP, FPGA, ASIC, etc.). Processing and control unit 620 may be capable of determining, storing and ultimately displaying mass spectra as well as controlling the output of wave forms to mass analyzer 616 and control and/or monitor operation of region 614 and detector 618. Processing and control unit 620 can contain data acquisition and searching software as well as databases for storing waveforms as well as software for generating customized waveforms. Processing and control unit 620 may comprise processor-usable media (not shown) such as memory, hard disk, etc. configured to store data, programming or other digital information. These implementations are merely exemplary, and other implementations may also be used.

Figure 7A:
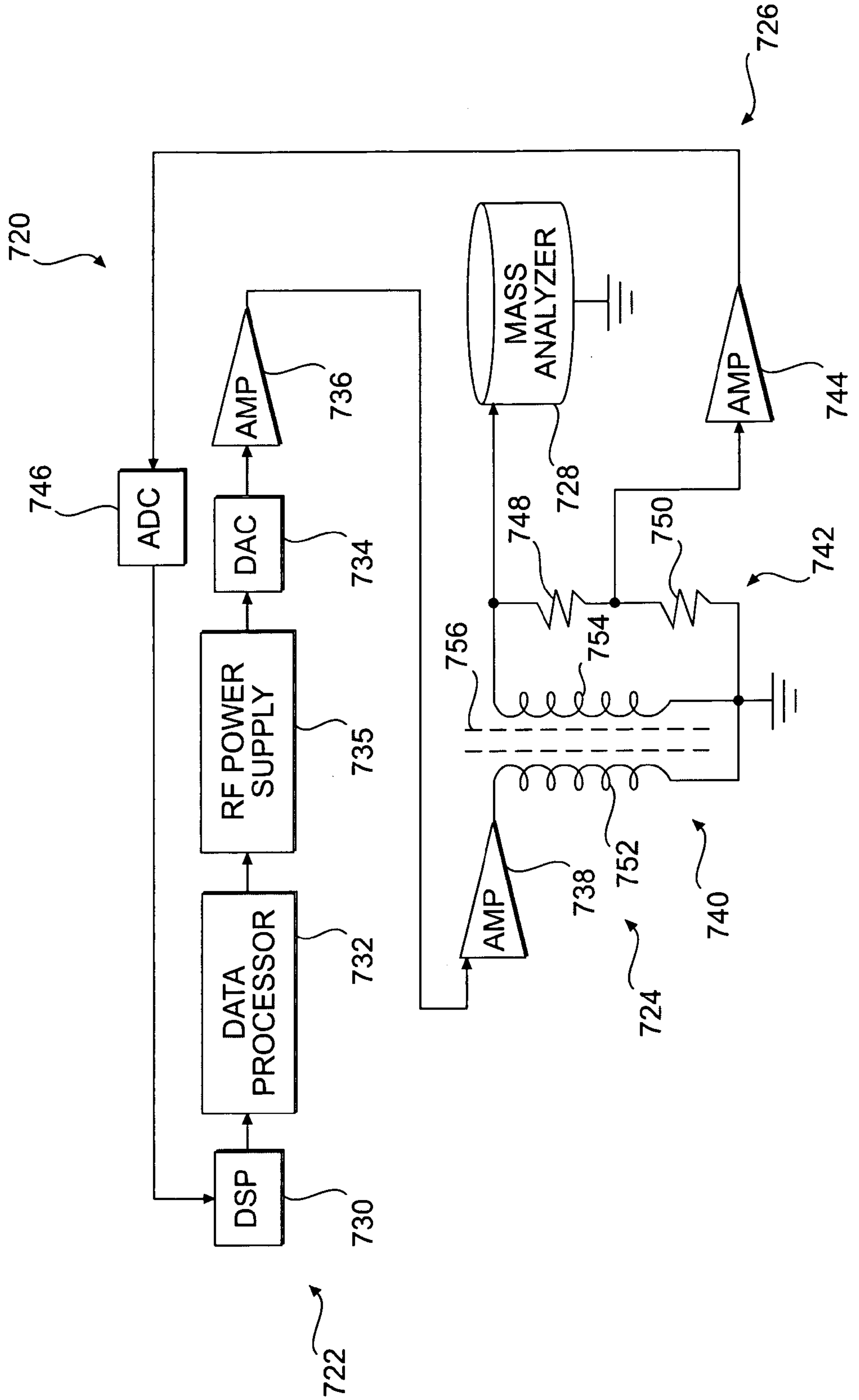
FIG. 7A is a schematic of a mass spectrometer consistent with one embodiment of the invention, as described in FIG. 6.

FIG. 7A is a schematic of a mass spectrometer consistent with one embodiment of the invention, as described in FIG. 6. As shown in FIG. 7A, in one implementation, mass spectrometer 720 includes signal generating circuitry 722, amplifying circuitry 724, feedback circuitry 726, and a mass analyzer 728. In one implementation, mass analyzer 728 is a cylindrical ion trap (CIT) having an electrode structure similar to that shown in FIG. 2 and described above. In another implementation, mass spectrometer 720 is portable. These implementations are merely exemplary, and other implementations may also be used.

In one implementation, signal generating circuitry 722 generates a radio frequency ("RF") voltage signal that is amplified by amplifying circuitry 724 to a magnitude on the order of 3000 volts. The amplified RF signal is applied to the mass analyzer 728. In the case of a CIT, the amplified RF signal is applied to the CIT for use in trapping ions within the CIT. Feedback circuitry 726 transmits back to the signal generating circuitry 722 a scaled-down, lower voltage version of the RF signal that was applied to the CIT 728. The signal generating circuitry 722 can analyze the scaled-down RF signal and accordingly adjust the RF voltage signal that is generated by the signal generating circuitry 722. This implementation is merely exemplary, and other implementations may also be used.

As shown in FIG. 7A, in one implementation, signal generating circuitry 722 includes a digital signal processor (DSP) 730, a data processor 732, a digital-to-analog converter (DAC) 734, and an RF power supply 735. In this implementation, the DSP 730 communicates to data processor 732 a desired digital RF voltage waveform to be transmitted to the DAC 734. In order to accommodate bus speed limitations of the DSP 730, the DSP 730 may specify that the desired digital RF voltage waveform be retrieved by data processor 732 from a waveform memory. Data processor 732 then signals RF power supply 735 to provide the digital RF voltage waveform to DAC 34. DAC 34 converts the digital RF signal to an analog RF signal, and then provides the analog RF signal to the buffer amplifier 36. This implementation is merely exemplary, and other implementations may also be used.

As further shown in FIG. 7A, in one implementation, amplifying circuitry 724 includes a buffer amplifier 736, a power amplifier 738, and a step-up transformer 740. Buffer amplifier 736 functions as an impedance buffer for the power amplifier 738. Power amplifier 738 amplifies the RF signal and provides the amplified RF signal to the step-up transformer 740. Transformer 740 further amplifies the RF signal to thereby output an RF voltage signal having a peak amplitude approximately in the range of 500 volts to 6000 volts, and preferably around 3000 volts. This RF voltage signal output by the transformer 740 is applied to mass analyzer 728. In another implementation, transformer 740 may be replaced with an inductor (not shown). In this implementation, voltage amplification results from the resonance nature of the capacitive load of the ion trap and the inductance of the coil. In yet another implementation, one of the coils of transformer 740 may be tuned to the capacitance of the ion trap to also take advantage of the resonance of the ion trap to further amplify the voltage. These implementations are merely exemplary, and other implementations may also be used.

Figure 1:
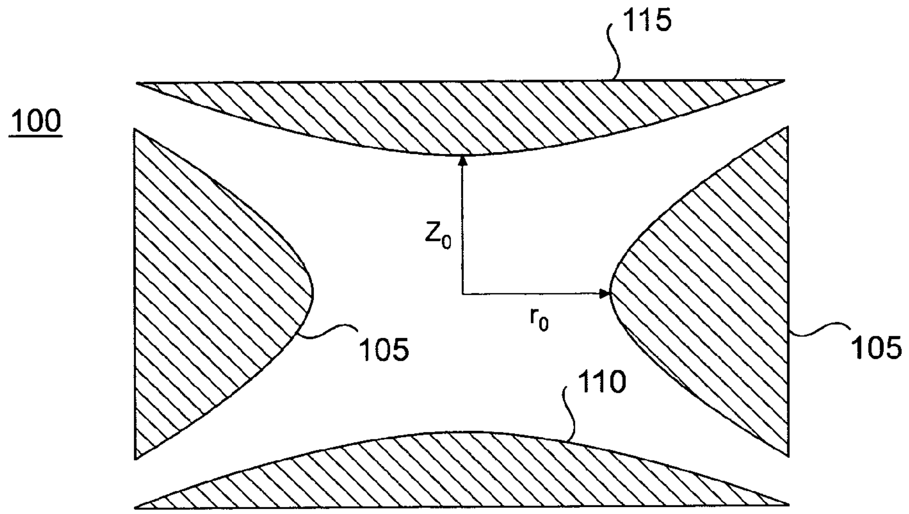
FIG. 1 PRIOR ART
FIG. 1 depicts a hyperbolic Paul ion trap.
Figure 2:
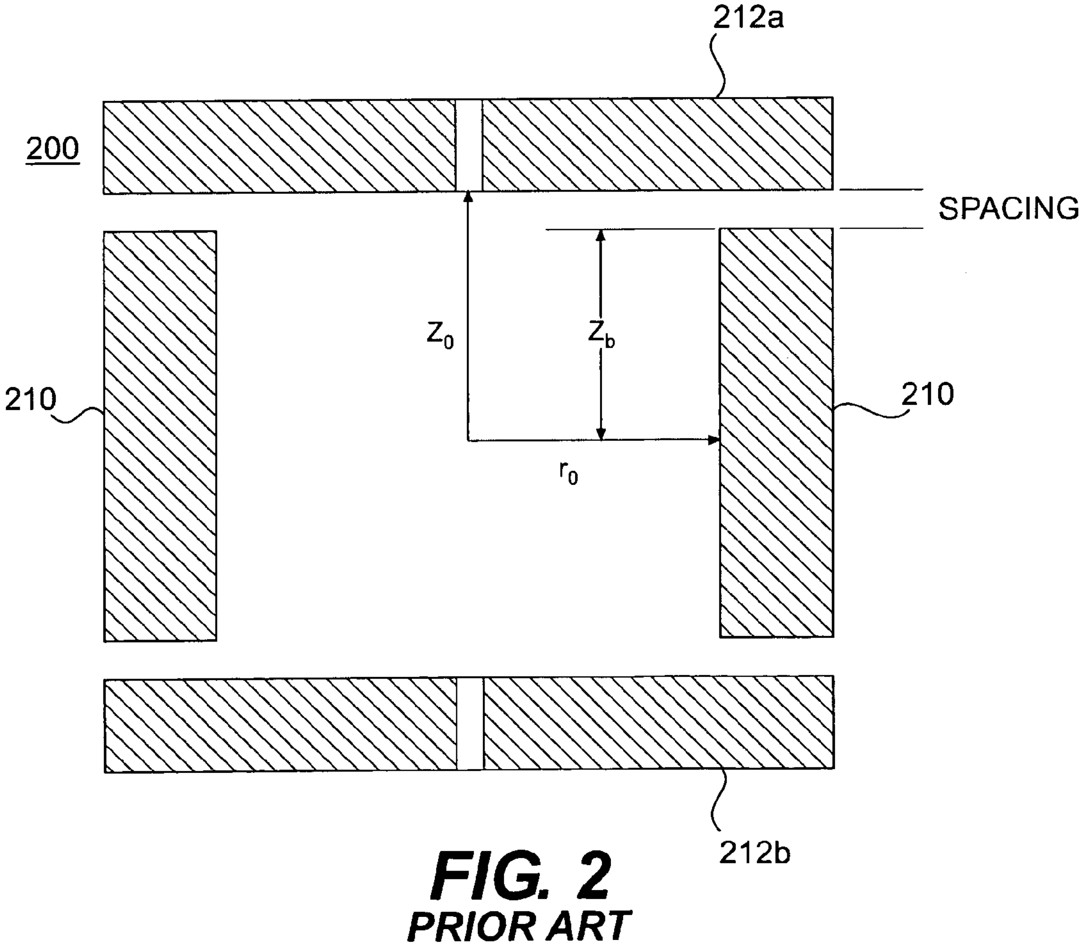
FIG. 2 PRIOR ART
FIG. 2 depicts a cylindrical ion trap.
Figure 3:
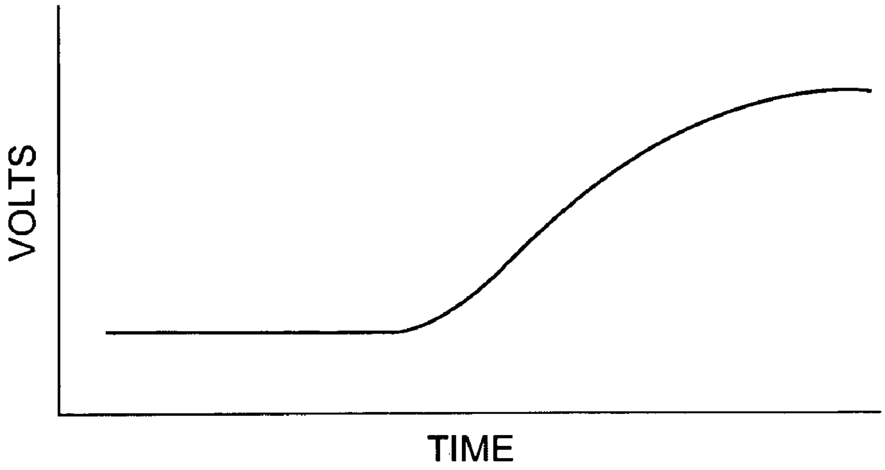
FIG. 3 PRIOR ART
FIG. 3 illustrates an exemplary standard voltage ramp of the type typically provided to a cylindrical ion trap during mass analysis in prior art devices.
Figure 4:
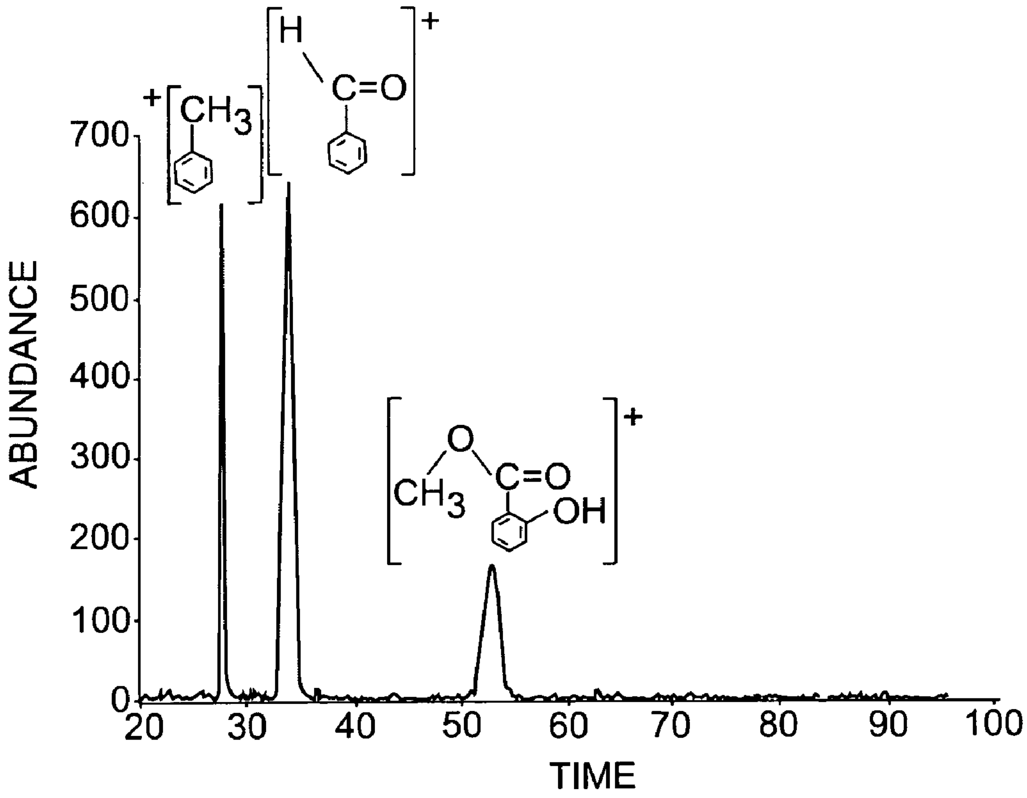
FIG. 4 PRIOR ART
FIG. 4 illustrates the mass spectra of methyl salicylate under the ramping conditions of FIG. 3.
Figure 5:
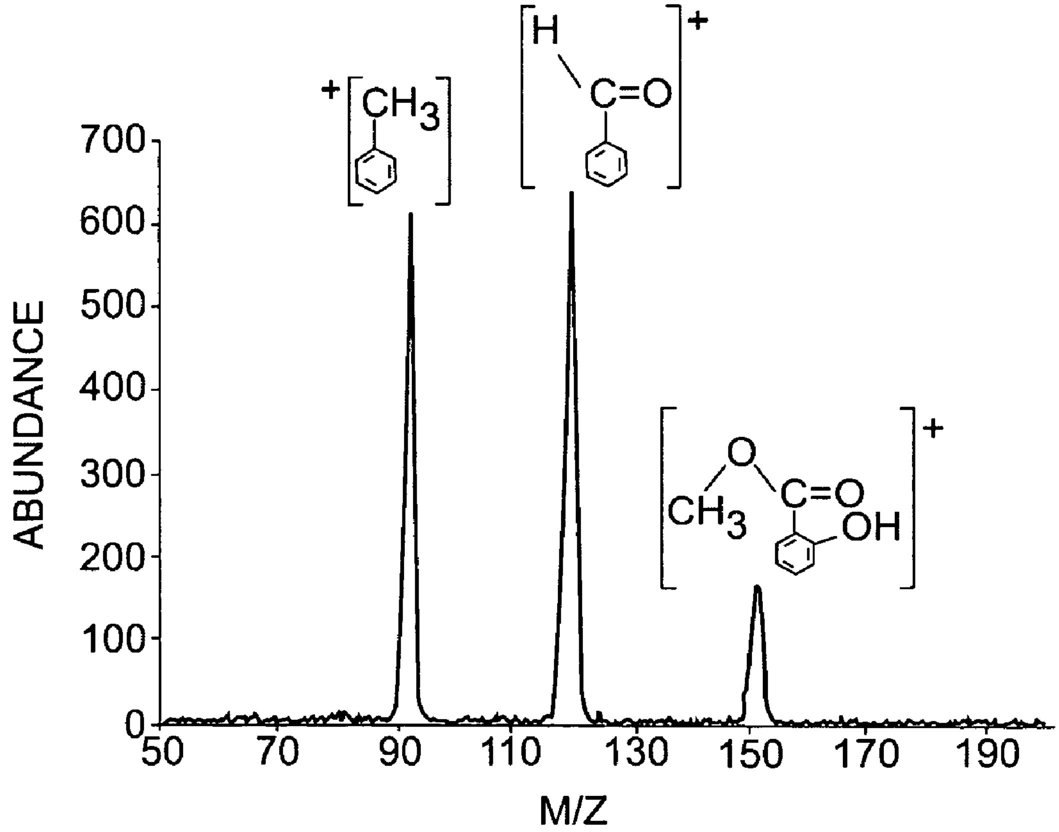
FIG. 5 PRIOR ART
FIG. 5 represents a desired mass spectra of methyl salicylate.

It has been found that a cylindrical ion trap (CIT) as shown in FIGS. 2 and 3 is generally capable of trapping ions by use of an RF voltage signal having a peak amplitude that is lower than the required peak amplitude of an RF voltage signal that is to be used in conjunction with a typical commercially available hyperbolic ion trap. More particularly, for reasons that are outside the scope of this document, the simplified geometry of a CIT allows a CIT to be produced with a volume and electrode radius that are smaller than that of a hyperbolic ion trap. It is well known that the required peak amplitude of the RF voltage signal is proportional to the square of the electrode radius of the ion trap. Thus, by virtue of its smaller electrode radius, a CIT may perform comparably to a hyperbolic ion trap while using an RF voltage signal of a lower peak voltage. Because a CIT is capable of performing with an RF voltage signal of a lower peak voltage, the peak voltage requirements of a step-up transformer can be lower when the transformer is used with a CIT than when the transformer is used with a hyperbolic ion trap. By virtue of the lower peak voltage requirements associated with a CIT, it has been found that the transformer 40 can be in the form of a toroidally-shaped, i.e., doughnut-shaped, transformer, sometimes referred to as a "donut transformer." That is, when used in conjunction with a CIT, transformer 740 need not be in the form of a cylindrically-shaped transformer. However, it may also be possible for the toroidally-shaped transformer of the present invention to be used in conjunction with a hyperbolic ion trap as well.

Another benefit of the lower peak voltages is that it may allow for alternate tuning methods. Depending on the type of sample to be analyzed, the desired RF waveform will vary. Therefore, typically, the RF power supply will include a tuning mechanism to alter the RF waveform. Historically, because of the high voltages involved in mass spectrometers, tuning was accomplished by modifying the inductance of a coil in an inductor. Capacitors could generally not be used because of their inability to handle the high peak voltages. Typically, the inductor was in the form of a coil on the order of 8 inches in length. The size of this inductor constrained the ability to make a portable mass spectrometer. In one implementation of the present invention, a capacitor may be used to tune the RF power supply because of the lower peak voltages. Examples of the type of tuning capacitors that may be used include air gap capacitors, dielectrically filled capacitors, manually adjustable high voltage capacitors, or electrically adjusted high voltage capacitors. The size of the tuning capacitor may be as small as 2–3 inches, thereby providing a significant reduction in the size of the device. This implementation is merely exemplary, and other implementations may also be used.

The desired RF waveform may be inputted by a user of the mass spectrometer in a number of ways. In one implementation, the user will input the phase, frequency, and amplitude of the signal. In another implementation, the phase and frequency will be input in one signal and the amplitude will be input separately. These implementations are merely exemplary, and other implementations may also be used.

Figure 8A:
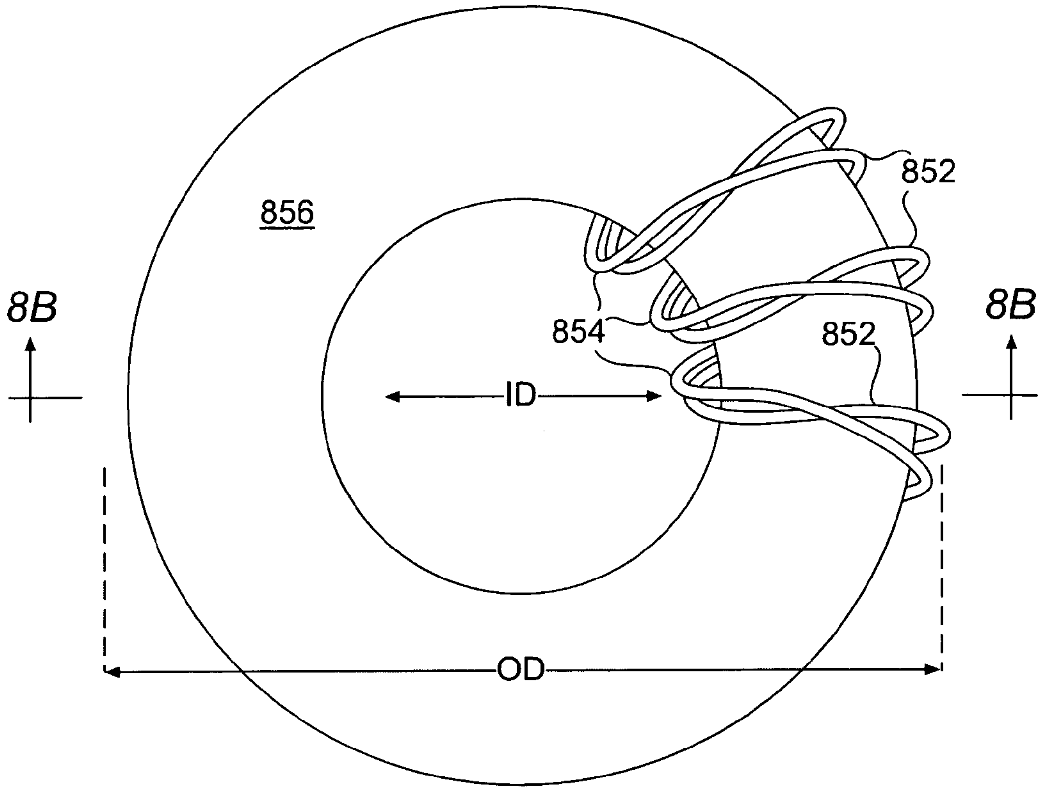
FIG. 8A illustrates a top view of a toroidally shaped transformer consistent with one embodiment of the invention.
Figure 8B:
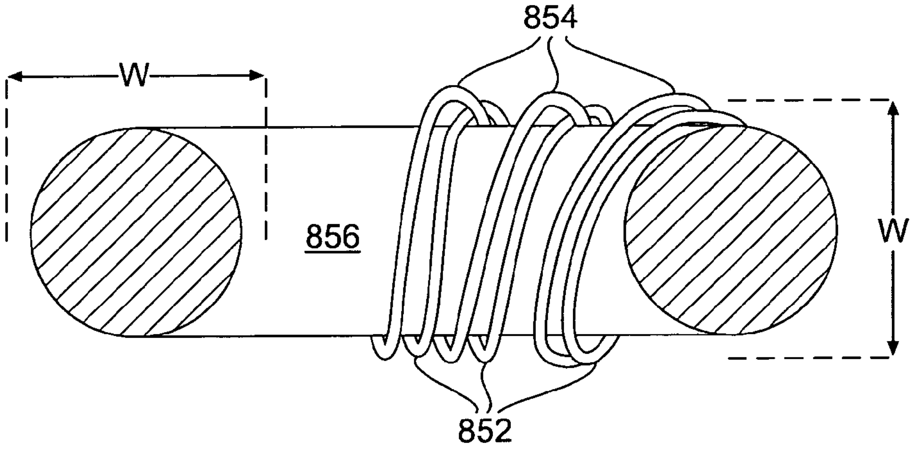
FIG. 8B illustrates a cross-sectional view of a toroidially shaped transformer consistent with one embodiment of the invention.

FIGS. 8A and 8B illustrate two views of a toroidially shaped transform consistent with one embodiment of the invention. As shown in FIGS. 8A and 8B, in one implementation, in order to form a toroidally-shaped transformer, such as transform 740 shown in FIG. 7A, a primary coil 852 and a secondary coil 854 can be wound in a toroidal shape. In a preferred embodiment, the primary coil 852 and the secondary coil 754 can both be wound around a same toroidally-shaped core 856. Core 856 can have a circular cross section, as shown in FIG. 8B. The transformer can be of the air-core variety, wherein core 856 is formed of a non-magnetic material such as fiber or plastic. Alternatively, core 856 can be formed of a magnetic material such as ferrite or iron in order to intensify the magnetic field induced by the current in the primary coil 852 and thereby enable the transformer to operate more efficiently. By virtue of the higher efficiency, a ferrite or iron core may allow the toroidal transformer's dimensions to be further reduced as compared to a toroidal transformer of the air-core variety. However, an air-core transformer may have a lower weight than a transformer having an iron or ferrite core. Further, an air-core may enable production of a peak voltage amplitude that is higher than peak voltage amplitudes that are achievable with an iron or ferrite core due to surface or breakdown effects of an iron or ferrite core.

Only a few windings of each of coils 852, 854 are shown in FIGS. 8A and 8B for ease of illustration. However, in one implementation, there are in the range of approximately 200 to 500 turns, i.e., windings, of secondary coil 854 wound around core 856, and in the range of approximately 2 to 5 turns of primary coil 852. In a preferred embodiment, the turn ratio is in the range of approximately 50:1 to 150:1, and, more particularly, approximately 100:1. In one embodiment of FIGS. 8A and 8B, secondary coil 854 is wound directly over primary coil 852 in order to enable efficient coupling of coils 852, 854. However it is also possible for secondary coil 854 to be wound inside, side-by-side or sandwiched between layers of primary coil 852. These implementations are merely exemplary, and other implementations may also be used.

In one implementation, the transformer of the mass spectrometer consistent with the invention has an outer diameter OD of four inches or less, an inner diameter ID of two inches or less, and a cross-sectional width W of one inch or less. Thus, the transformer provides a substantial space-savings in comparison to a conventional cylindrical transformer having a diameter of three inches and a height of six inches. More specifically, a conventional cylindrical transformer occupies a volume given by the formula $\pi(\text{radius})^2\times\text{height}$. Thus, a conventional cylindrical transformer having a diameter of three inches and a height of six inches occupies a volume of $\pi[\frac{1}{2}(3\text{ inches})]^2\times 6$ inches, or approximately 42 $\text{in}^3$. Since the central hole or gap in a toroidal transformer may be wasted space, a toroidal transformer effectively occupies a volume that is also approximately given by the formula $\pi(\text{radius})^2\times\text{height}$. Thus, a toroidal transformer having a diameter of four inches and a height (cross-sectional width) of one inch effectively occupies a volume of $\pi[\frac{1}{2}(4\text{ inches})]^2\times 1$ inch, or approximately 13 $\text{in}^3$. Thus, the 13 $\text{in}^3$ effectively occupied by one embodiment of a toroidal transformer of the present invention is significantly less volume than the 42 $\text{in}^3$ occupied by a comparable conventional cylindrical transformer. As can be seen in FIGS. 8A and 8B, the dimensions ID, OD and W are substantially determined by the dimensions of the core 856, with some allowance being made for the thicknesses of the coils 852 and 854 that are wound therearound.

Toroidally-shaped transformers consistent with the present invention also have advantages in terms of radio frequency interference and/or electromagnetic interference over a conventional cylindrical transformer. More particularly, the toroidally-shaped transformer tends to broadcast radio frequency signals in a circular direction around the core. In contrast, a cylindrical transformer tends to broadcast radio frequency signals in a linear direction. Thus, RF signals broadcast by the toroidally-shaped transformer are more likely to remain within the transformer, while the RF signals broadcast by the cylindrical transformer are more likely to be directed to external devices that may be inside or outside the mass spectrometer.

In another implementation, the core can have a square or rectangular cross section. Moreover, it is possible for the coils 852, 854 to be wound in air in a toroidal shape. That is, the coils can be wound in a toroidal shape without the use of a core. These implementations are merely exemplary, and other implementations may also be used.

The toroidally-shaped transformer of the present invention has been described herein as being used in a spectrometer having a cylindrical ion trap. However, it is to be understood that it is within the scope of the present invention for a spectrometer to include a toroidally-shaped transformer in conjunction with a hyperbolic ion trap or some other type of ion trap.

As discussed above, the RF waveform from transformer 740 is provided to mass analyzer 728, where it is used to perform an analysis as described above. In some implementations, including the use of CITs, the analysis is performed under vacuum. Therefore, a feedthrough is needed to take the output of transformer 740 and apply it to the mass analyzer under vacuum. The construction of the feedthrough, however, can effect the tune of the coil of transform 740 if the feedthrough has too high of a capacitance. Therefore, in one implementation, the feedthrough has a low capacitance construction.

Figure 11A:
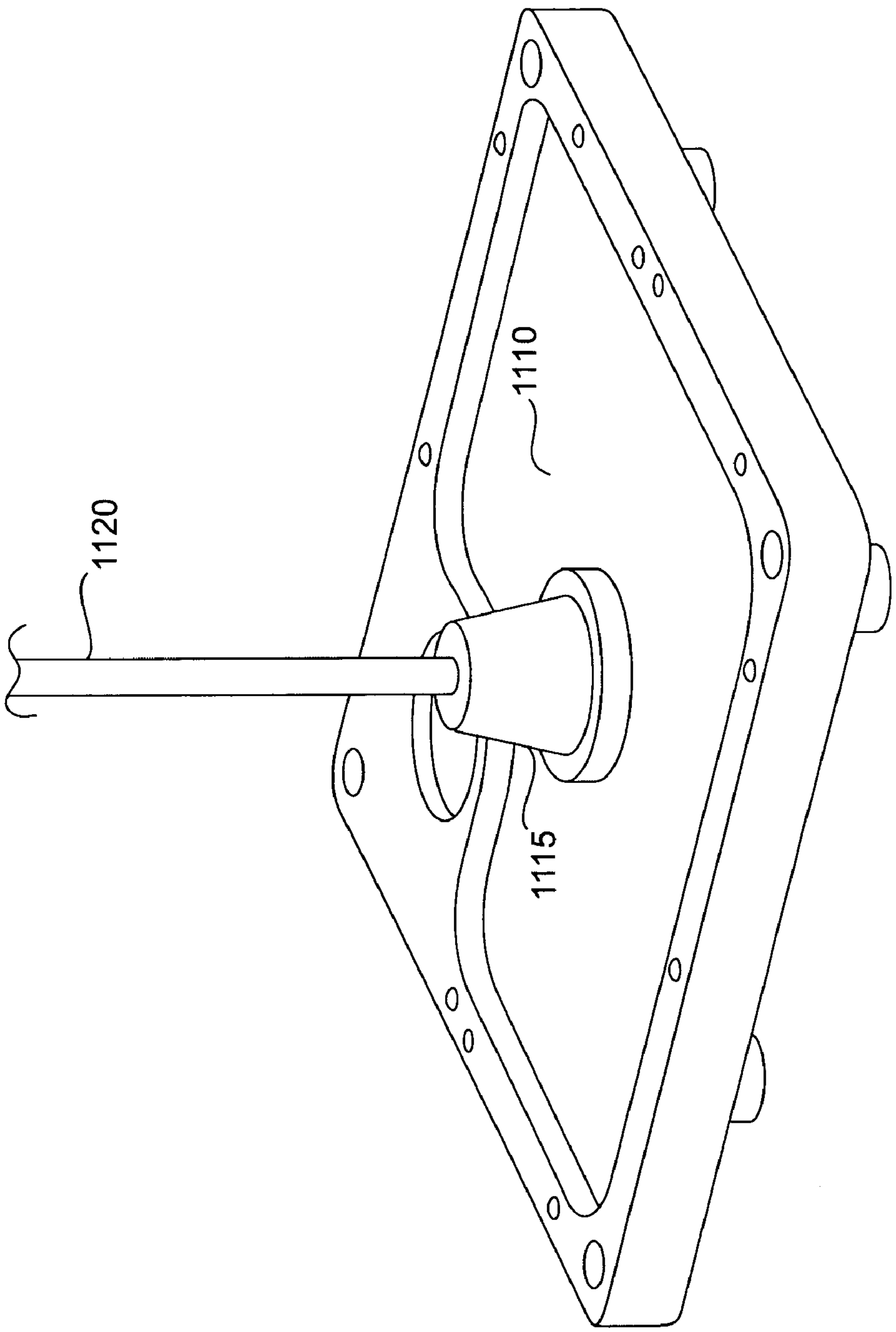
FIG. 11A illustrates a vacuum feedthrough in accordance with one embodiment of the invention.
Figure 11B:
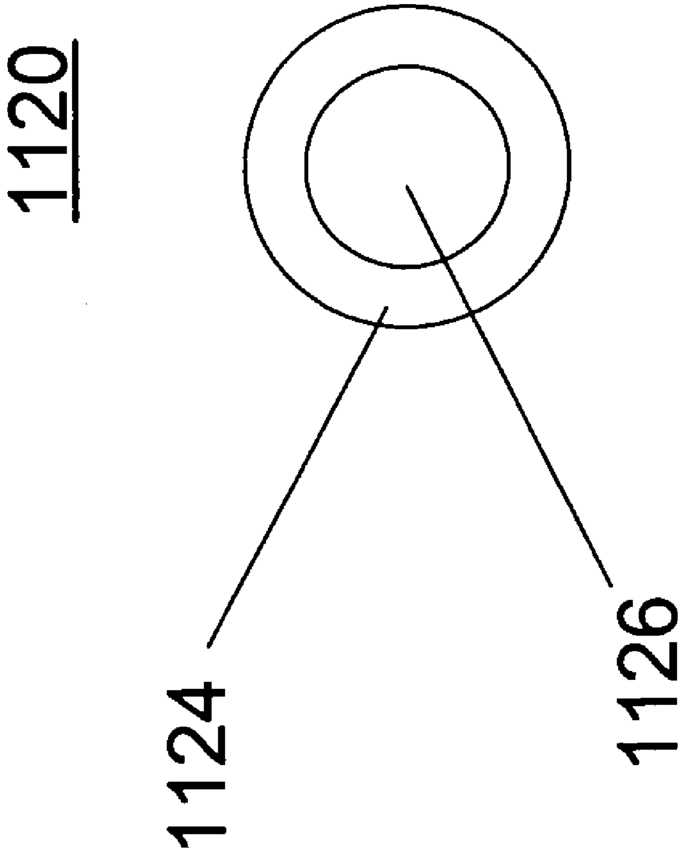
FIG. 11B illustrates a cross-section of a feedthrough in accordance with one embodiment of the invention.

FIG. 11A illustrates a vacuum feedthrough in accordance with one embodiment of the invention. As shown in FIG. 11A, feedthrough 1120 provides a mechanism for feeding a wire through a plate 1110 and into the mass analyzer. Feed through 1120 is generally constructed of a wire carrying the RF waveform to be applied to the mass analyzer embedded in another material, such as ceramic, epoxy, plastic, or rubber. FIG. 11B illustrates a cross-section of a feedthrough in accordance with one embodiment of the invention. In FIG. 11B, wire 1126 has been embedded in material 1124. In another implementation, material 1124 will be epoxy. The use of epoxy results in a savings of cost, size, weight, and capacitance. This epoxy construction has a low capacitance in the range of 0.5–5 pF. This low capacitance will result in fewer errors during the measurement process. It should be understand that FIG. 11B is merely an illustration of one implementation of a feedthrough and the relative widths of wire 1126 and material 1124. These implementations are merely exemplary, and other implementations may also be used.

As also shown in FIG. 11A, feedthrough 1120 includes a flange portion 1115. Flange portion 1115 abuts plate 1110. Plate 1110 is integrated with mass analyzer 728 and provides a pathway for feedthrough 1120. In one implementation plate 1110 will be constructed of aluminum. Because the mass analyzer is kept at vacuum, feedthrough 1120 will also be sealed at vacuum. An O-ring (not shown) will often be placed under flange portion 1115 to create a seal sufficient to draw a vacuum. This implementation is merely exemplary, and other implementations may also be used.

As was also discussed above, feedback circuitry 726 transmits back to the signal generating circuitry 722 a scaled-down version of the RF signal that was applied to the CIT 728. Feedback circuitry 726 includes a voltage divider 742, a buffer amplifier 744, and an analog-to-digital converter (ADC) 746. In one implementation, it may be desirable to maximize the voltage gain of transformer 740 in order to better achieve an output voltage on the order of 6000 volts. The voltage gain of transformer 740 is greater when transformer 740 operates in resonance. Thus, it may be desirable to operate transformer 740 closer to a state of resonance by monitoring the output of transformer 740 and adjusting the desired RF signal specified by the DSP 730 accordingly. Monitoring can be provided by scaling down the output signal of transformer 740, and feeding the scaled-down signal back to DSP 730. DSP 730 can then analyze the signal and adjust the desired waveform specified and/or generated by the DSP 30 accordingly.

Specifically, in one implementation, voltage divider 742 includes resistors 748 and 750 to scale the multi-kilovolt output of transformer 740 down to a manageable magnitude that may then be transmitted by buffer amplifier 744 to ADC 746. ADC 746 can convert the analog feedback signal from the buffer amplifier 744 to digital form, and then provide the digital version of the feedback signal to DSP 730. These implementations are merely exemplary and other implementations may also be used.

In some instances because of the large voltages transmitted to the mass analyzer, it may be difficult for DSP 730 to determine precisely the value of the output voltage. In one implementation, a capacitor will be integrated into the circuit board containing DSP 730 as well as other circuit elements. In this implementation, the DSP 730 (or analog comparator) can sense the voltage capacitively using well-known methods rather then measuring the voltage directly. In one implementation, the inherent capacitance of the circuit board may be used as a capacitor because the typical circuit board material is dielectric. In another implementation, a trace or pad may be added on both surfaces of the board to form the capacitor. It will also be important for the capacitor not to affect the performance of the electronics. Therefore, the capacitance of the capacitor will typically be small on the order of about 0.5 ρf to 5 ρf. This implementation is merely exemplary and other implementations may also be used.

Figure 7B:
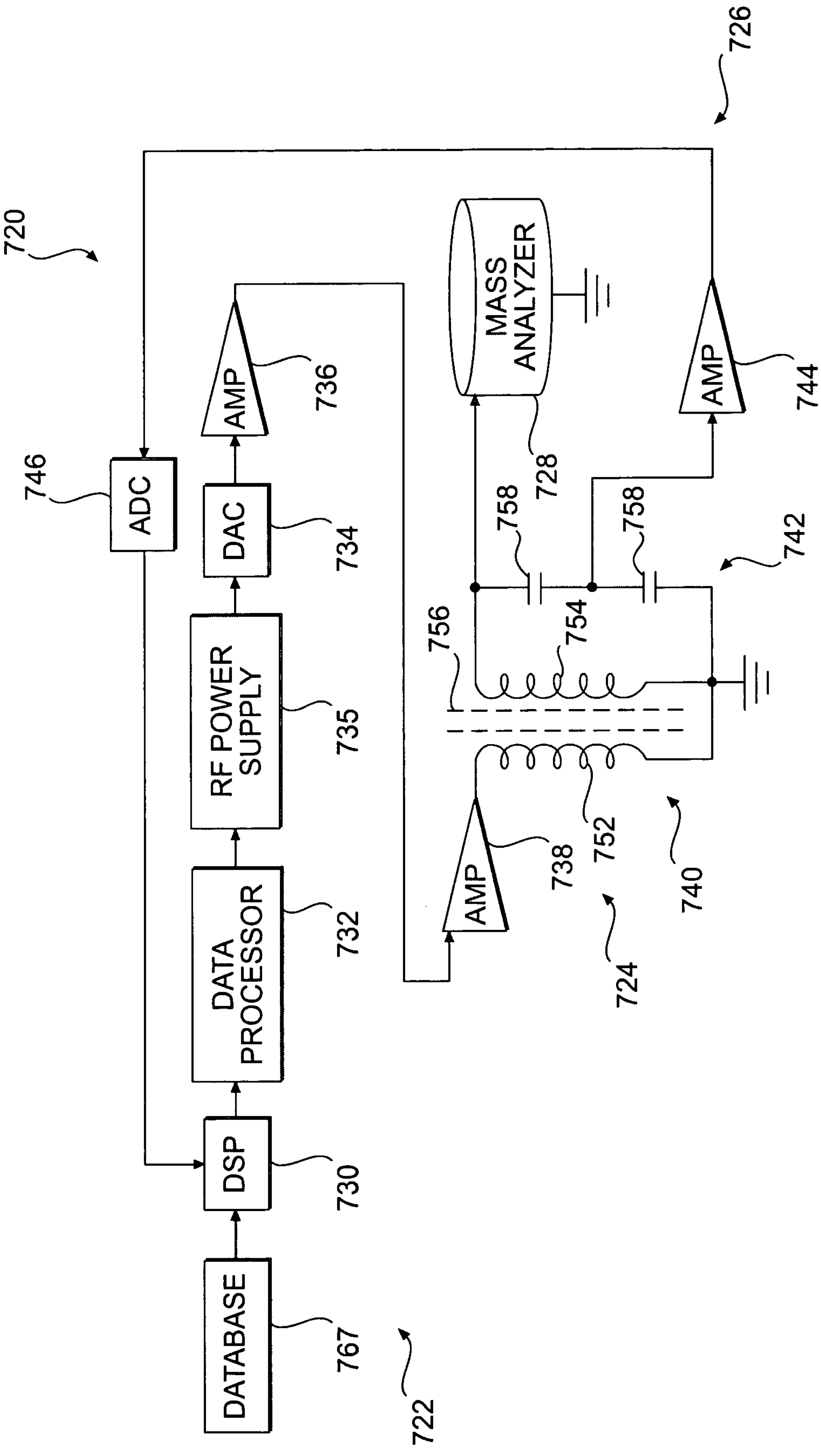
FIG. 7B is a schematic of a mass spectrometer consistent with another embodiment of the invention, as described in FIG. 6.

FIG. 7B is a schematic of a mass spectrometer consistent with another embodiment of the invention, as described in FIG. 6. The schematic of FIG. 7B is substantially the same as that of FIG. 7A, however feedback circuitry 726 has been altered. In this implementation, current from transformer 740 is conveyed to mass analyzer 728 through an impedance divider 758 where at least a portion of the current in the circuit is conveyed to amplifier 744. As shown in FIG. 7B, in one implementation, impedance divider 758 comprises two capacitors. This implementation is merely exemplary and other implementations may also be used.

In this implementation, mass spectrometer 720 also comprises a database 767, which stores values, which are used to generate one or more waveforms, which may be applied to mass analyzer 728 during the operation of mass spectrometer 720. Digital signal processor 730 compares respective values from analog to digital converter 746 with respective desired values of voltage in database 767 to verify the amount of voltage being conveyed to mass analyzer 728 corresponds to the respective desired values. Responsive to the comparison, data processor 732 can dynamically adjust RF power supply 735 to compensate for any differences between the desired predetermined waveform and active data received from digital signal processor 730. A standard comparative amplifier may also be utilized to provide feedback to data processor 732. This implementation is merely exemplary and other implementations may also be used.

Figure 9:
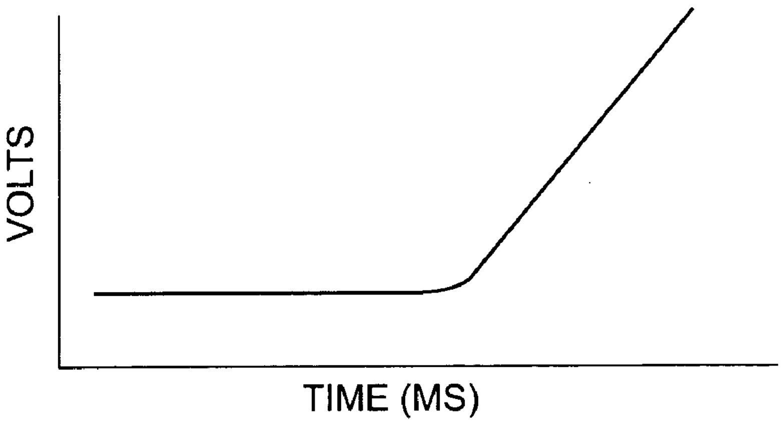
FIG. 9 illustrates a voltage ramp created using the mass spectrometer of FIG. 7B consistent with one embodiment of the invention.

The technique of FIG. 7B can result in voltage ramps that are more desirable. An exemplary voltage ramp using this technique is shown in FIG. 9. As shown the ramp of FIG. 9 increases at a more constant (e.g., linear) rate than the prior art voltage ramp of FIG. 3.

Figure 10:
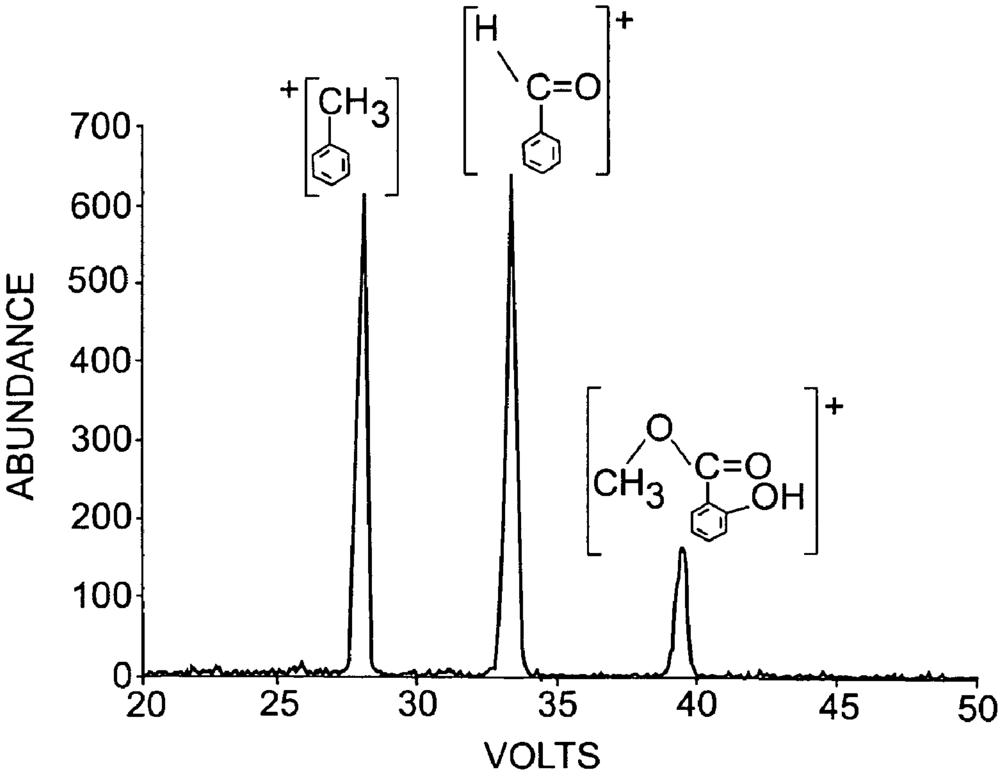
FIG. 10 depicts the correlation of ions of methyl salicylate with the voltage ramp of FIG. 9 consistent with one embodiment of the invention.

An exemplary correlation is depicted in FIG. 10. FIG. 10 depicts the correlation of ions of methyl salicylate with the voltage ramp of FIG. 9. At least one of the desirable effects demonstrated by calibrating mass spectrometer 720 in this fashion is constant peak width that compares favorably with the ideal spectra of FIG. 3. This implementation is merely exemplary and other implementations may also be used.

In another implementation, feedback circuitry 726 may also include an analog comparator. In this implementation, the analog comparator compares the analog feedback voltage signal to a reference signal. The comparator can then check for any nonlinearities in the RF waveform. This implementation is merely exemplary and other implementations may also be used.

The feedback voltage can also be used to calibrate mass spectrometer 720 for chemical analysis in an improved manner. In the past, in order to calibrate a mass spectrometer, a calibration compound with known mass was analyzed using the machine. The masses of any samples were then inferred based on the results of the analysis of the calibration compound. However, if any changes occurred over time, such as a drift in voltages, then the calibration would be off resulting in errors.

In one implementation of the present invention, as discussed above, the RF voltage is measured directly. Therefore, in one implementation, the mass of the sample can be determined directly from the RF voltage. Therefore, even if there are changes in the device over time, measurements will continue to be accurate because the applied voltage will be known. In another implementation, a calibration compound may still be used initially to ensure that feedback circuitry 726 is accurately measuring the RF voltage measured. These implementations are merely exemplary and other implementations may also be used.

It should be understood that the various implementations describe above can allow for a reduction in the size of a mass spectrometer. In one implementation, the elements of the mass spectrometer will be capable of fitting in a housing having dimensions of 6 inches×7 inches×8 inches or smaller.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mass spectrometer for analyzing a sample, comprising:

a signal generator to generate a radio frequency voltage signal;

an amplifying circuit to amplify the radio frequency voltage signal, the amplifying circuit including a toroidally shaped transformer; and an ion trap including an electrode; wherein the amplified radio frequency voltage signal is applied to the electrode to analyze the sample.

2. The mass spectrometer of claim 1, wherein said ion trap comprises a cylindrical ion trap.

3. The mass spectrometer of claim 1, wherein said toroidally-shaped transformer has an outer diameter less than or equal to approximately four inches.

4. The mass spectrometer of claim 1, wherein said toroidally-shaped transformer has a cross-sectional width less than or equal to approximately one inch.

5. The mass spectrometer of claim 1, wherein said transformer has a primary coil and a secondary coil, said primary coil having a range of approximately 2 to 5 windings, and said secondary coil having a range of approximately 200 to 500 windings.

6. The mass spectrometer of claim 5, wherein said transformer has a turn ratio in the range of approximately 50:1 to 150:1.

7. The mass spectrometer of claim 5, wherein said transformer has a core formed of a magnetic material, said primary coil and said secondary coil being wound around said core.

8. The mass spectrometer of claim 1, wherein said magnetic material comprises at least one of ferrite and iron.

9. The mass spectrometer of claim 1, wherein the amplified radio frequency voltage signal has a peak amplitude in the range of approximately 500 volts to 6000 volts.

10. The mass spectrometer of claim 1, wherein said electrode comprises a ring electrode.

11. A mass spectrometer for analyzing a sample, comprising:
- a signal generator to generate a radio frequency voltage signal;
- an amplifying circuit to amplify the radio frequency voltage signal;
- the amplifying circuit including a toroidally shaped transformer;
- a mass analyzer, wherein the amplified radio frequency voltage signal is applied to the mass analyzer to analyze the sample;
- a feedback circuit for generating a feedback radio frequency voltage signal based on the amplified radio frequency voltage signal applied to the mass analyzer; and
- a signal processor to instruct the signal generator to alter the radio frequency voltage signal based on the feedback radio frequency voltage signal.

12. The mass spectrometer of claim 11, wherein the feedback circuit includes an impedance divider.

13. The mass spectrometer of claim 12, further comprising a database of reference radio frequency voltage signals, wherein the signal processor compares the feedback radio frequency voltage signal to a reference radio frequency voltage signal in the database to determine whether to instruct the signal generator to alter the radio frequency voltage signal.

14. The mass spectrometer of claim 11, wherein the feedback circuit includes a capacitor to sense the voltage applied to the mass analyzer capacitively.

15. The mass spectrometer of claim 14, wherein the capacitor has a capacitance in the range of 0.5 ρf to 5 ρf.

16. The mass spectrometer of claim 11, wherein the feedback circuit is located on a circuit board and wherein the feedback circuit senses the voltage applied to the mass analyzer based on the capacitance of the circuit board.

17. A mass spectrometer for analyzing a sample, comprising:
- a signal generator to generate a radio frequency voltage signal, wherein the signal generator includes a tuning capacitor to tune the radio frequency voltage signal;
- an amplifying circuit to amplify the radio frequency voltage signal, the amplifying circuit including a toroidally shaped transformer; and
- an ion trap including an electrode; wherein the amplified radio frequency voltage signal is applied to the electrode to analyze the sample.

18. A mass spectrometer for analyzing a sample, comprising:
- a signal generator to generate a radio frequency voltage signal an amplifying circuit to amplify the radio frequency voltage signal, the amplifying circuit including a toroidally shaped transformer;
- an ion trap including an electrode; wherein the amplified radio frequency voltage signal is applied to the electrode to analyze the sample; and
- a feedthrough comprising a wire embedded in epoxy to apply the amplified radio frequency voltage signal to the electrode.

19. A mass spectrometer for analyzing a sample, comprising:
- a signal generator to generate a radio frequency voltage signal;
- an amplifying circuit to amplify the radio frequency voltage signal, the amplifying circuit including a toroidally shaped transformer;
- a cylindrical ion trap including an electrode; wherein the amplified radio frequency voltage signal is applied to the electrode to analyze the sample;
- a feedback circuit for generating a feedback radio frequency voltage signal based on the amplified radio frequency voltage signal applied to the electrode; and
- a signal processor to instruct the signal generator to alter the radio frequency voltage signal based on the feedback radio frequency voltage signal.

20. The mass spectrometer of claim 19, wherein said toroidally-shaped transformer has an outer diameter less than or equal to approximately four inches.

21. The mass spectrometer of claim 19, wherein said toroidally-shaped transformer has a cross-sectional width less than or equal to approximately one inch.

22. The mass spectrometer of claim 19, wherein said transformer has a primary coil and a secondary coil, said primary coil having a range of approximately 2 to 5 windings, and said secondary coil having a range of approximately 200 to 500 windings.

23. The mass spectrometer of claim 22, wherein said transformer has a turn ratio in the range of approximately 50:1 to 150:1.

24. The mass spectrometer of claim 22, wherein said transformer has a core formed of a magnetic material, said primary coil and said secondary coil being wound around said core.

25. The mass spectrometer of claim 19, wherein said magnetic material comprises at least one of ferrite and iron.

26. The mass spectrometer of claim 19, wherein the amplified radio frequency voltage signal has a peak amplitude approximately between 500 volts and 6000 volts.

27. The mass spectrometer of claim 19, wherein said electrode comprises a ring electrode.

28. The mass spectrometer of claim 19, wherein the feedback circuit includes an impedance divider.

29. The mass spectrometer of claim 19, further comprising a database of reference radio frequency voltage signals, wherein the signal processor compares the feedback radio frequency voltage signal to a reference radio frequency voltage signal in the database to determine whether to instruct the signal generator to alter the radio frequency voltage signal.

30. The mass spectrometer of claim 19, wherein the feedback circuit includes a capacitor to sense the voltage applied to the mass analyzer capacitively.

31. The mass spectrometer of claim 30, wherein the capacitor has a capacitance in the range of about 0.5 ρf to 5 ρf.

32. The mass spectrometer of claim 19, wherein the signal generator includes a tuning capacitor to tune the radio frequency voltage signal.

33. The mass spectrometer of claim 19, further comprising a feedthrough comprising a wire embedded in epoxy to apply the amplified radio frequency voltage signal to the electrode.

34. A mass spectrometer for analyzing a sample, comprising:

a signal generator to generate a radio frequency voltage signal;

an amplifying circuit to amplify the radio frequency voltage signal, the amplifying circuit including a toroidally shaped transformer;

an ion trap including an electrode; wherein the amplified radio frequency voltage signal is applied to the electrode to analyze the sample; and a housing encasing the signal generator, amplifying circuit, and ion trap having dimensions of no greater than about 6 inches×7 inches×8 inches.

35. A method of analyzing a sample with a mass spectrometer, comprising:

generating a radio frequency voltage signal;

amplifying the radio frequency voltage signal using a toroidally shaped transformer; and applying the amplified radio frequency voltage to an electrode of an ion trap to analyze the sample.

36. A method of analyzing a sample with a mass spectrometer, comprising:

generating a radio frequency voltage signal;

amplifying the radio frequency voltage signal;

including a toroidally shaped transformer;

applying the amplified radio frequency voltage signal to a mass analyzer to analyze the sample;

generating a feedback radio frequency voltage signal based on the amplified radio frequency voltage signal applied to the mass analyzer; and altering the radio frequency voltage signal based on the feedback radio frequency voltage signal.

37. A method of analyzing a sample with a mass spectrometer, comprising:

generating a radio frequency voltage signal;

amplifying the radio frequency voltage signal using a toroidally shaped transformer;

applying the amplified radio frequency voltage signal to an electrode of a cylindrical ion trap to analyze the sample;

generating a feedback radio frequency voltage signal based on the amplified radio frequency voltage signal applied to the electrode; and altering the radio frequency voltage signal based on the feedback radio frequency voltage signal.

38. A mass spectrometer for analyzing a sample, comprising:

a signal generator to generate a radio frequency voltage signal;

an amplifying circuit to amplify the radio frequency voltage signal;

the amplifying circuit including a toroidally shaped transformer;

a mass analyzer, wherein the amplified radio frequency voltage signal is applied to the mass analyzer to analyze the sample;

a feedback circuit for generating a feedback radio frequency voltage signal based on the amplified radio frequency voltage signal applied to the mass analyzer; and wherein the mass analyzer determines the mass of molecules contained in the sample based on a measurement of the feedback radio frequency voltage signal.

39. The mass spectrometer of claim 38, wherein the feedback circuit includes an impedance divider.

40. The mass spectrometer of claim 38, wherein the measurement of the feedback radio frequency voltage signal is made using a capacitor to sense the voltage.

41. The mass spectrometer of claim 40, wherein the capacitor has a capacitance in the range of 0.5 ρf to 5 ρf.

42. The mass spectrometer of claim 38, wherein the feedback circuit is located on a circuit board and wherein the measurement of the feedback radio frequency voltage signal is made capacitively using the capacitance of the circuit board.

43. A method of analyzing a sample with a mass spectrometer, comprising:

generating a radio frequency voltage signal;

amplifying the radio frequency voltage signal;

including a toroidally shaped transformer;

applying the amplified radio frequency voltage signal to a mass analyzer to analyze the sample;

generating a feedback radio frequency voltage signal based on the amplified radio frequency voltage signal applied to the mass analyzer;

measuring the feedback radio frequency voltage signal; and determining the mass of molecules contained in the sample based on the measurement of the feedback radio frequency voltage signal.

* * * * *

UNITED STATES PATENT AND TRADEMARK OFFICE

CERTIFICATE OF CORRECTION

PATENT NO. : 7,161,142 B1
APPLICATION NO. : 11/218635
DATED : January 9, 2007
INVENTOR(S) : Garth E. Patterson et al.

It is certified that error appears in the above-identified patent and that said Letters Patent is hereby corrected as shown below:

In claim 18, column 14, line 15, “signal an” should read --signal; an--.

Signed and Sealed this

Thirteenth Day of March, 2007

JON W. DUDAS

*Director of the United States Patent and Trademark Office*